Jan. 8, 1929.　　　　　　　　　　　　　　　　　1,698,143
A. PETROV
VOICE MECHANISM FOR DOLLS
Filed Dec. 8, 1926　　　　2 Sheets-Sheet 1

INVENTOR:
Arthur Petrov.
BY
ATTORNEY.

Jan. 8, 1929.

A. PETROV 1,698,143

VOICE MECHANISM FOR DOLLS

Filed Dec. 8, 1926   2 Sheets-Sheet 2

INVENTOR:
Arthur Petrov.
BY
Fred J. Marson
ATTORNEY.

Patented Jan. 8, 1929.

1,698,143

UNITED STATES PATENT OFFICE.

ARTHUR PETROV, OF ST. LOUIS, MISSOURI, ASSIGNOR TO ST. LOUIS DOLL & TOY MFG. CO., OF ST. LOUIS, MISSOURI, A CORPORATION OF MISSOURI.

VOICE MECHANISM FOR DOLLS.

Application filed December 8, 1926. Serial No. 153,371.

My invention relates to voice mechanism for dolls.

The object of my present invention is the provision of means to be mounted within dolls, transversely thereof, for the purpose of simulating the natural "pa-pa" and "ah-ma-ma" call of an infant child.

A further object of the invention is to provide a voice mechanism for the purpose of simulating the spoken pronunciation, or call "pa-pa" of the infant child when the device is tilted sideways in one direction to an angular position, and of simulating the spoken pronunciation, or call "ah-ma-ma" of the infant child when the device is tilted sideways in the opposite direction to an angular position.

A further object of the invention is to provide a voice mechanism embodying two opposed bellows contracted and expanded by a slidably mounted gravity weight having associated therewith sound producing means and means for controlling the sounds produced.

A further object of the invention is the provision of a voice mechanism for dolls, which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views.

Figure 1:
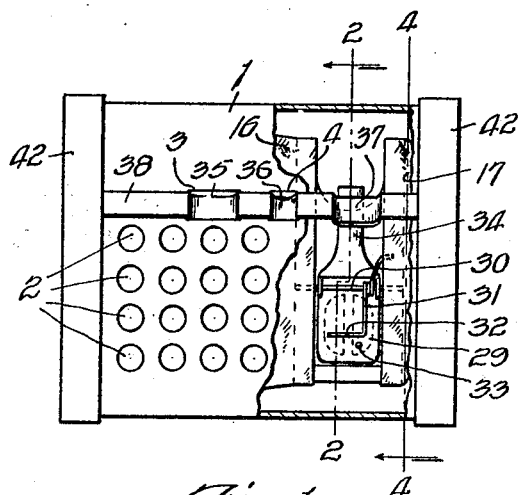
Fig. 1, is a top plan view of the voice mechanism embodying the features of my invention, the case thereof being shown as partly broken away.
Figure 2:
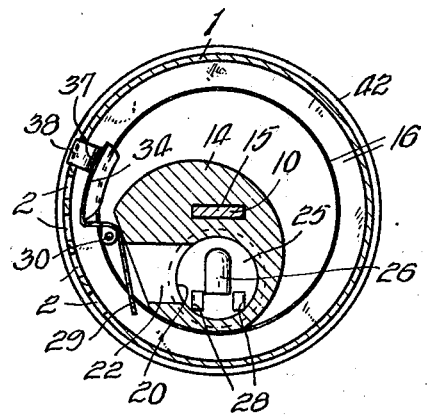
Fig. 2, is a sectional view of the device taken on line 2—2 of Fig. 1.
Figure 3:
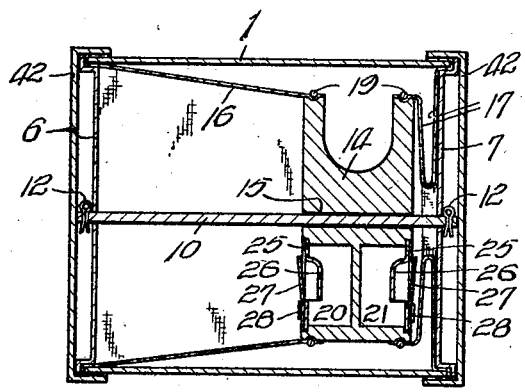
Fig. 3, is a sectional view taken on line 3—3 of Fig. 4.
Figure 4:
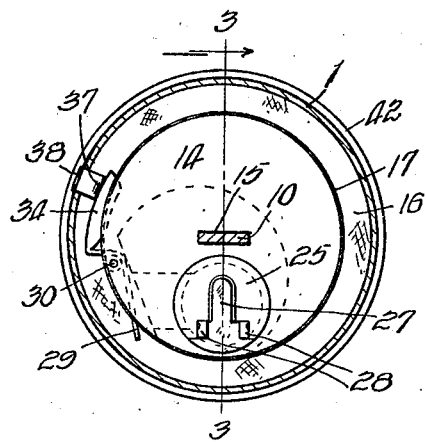
Fig. 4, is a sectional view taken on line 4—4 of Fig. 1.
Figure 5:
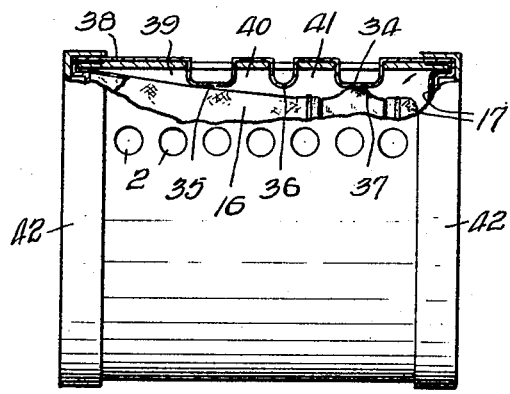
Fig. 5, is a front elevation of the device with a portion of the case in sectional elevation to clearly illustrate the position of the valve trip bar.
Figure 6:
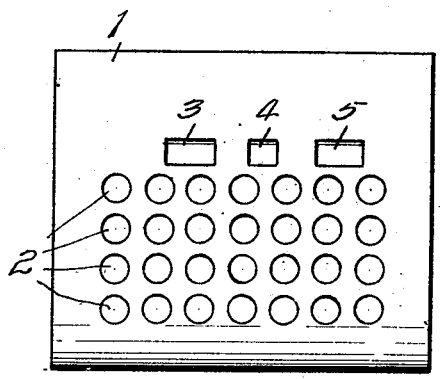
Fig. 6, is a plan view of the casing.
Figure 7:
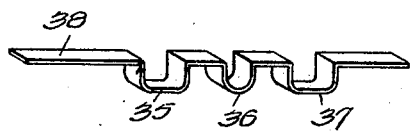
Fig. 7, is a perspective view of the valve trip bar.
Figures 8, 9:
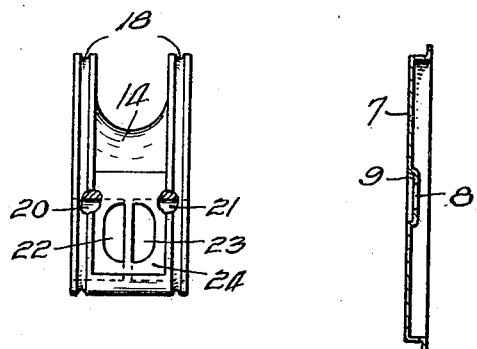
Fig. 8, is a top plan view of the air expelling member of gravity moved piston.
Fig. 9, is a sectional view of one of the bellows heads.
Figure 10:
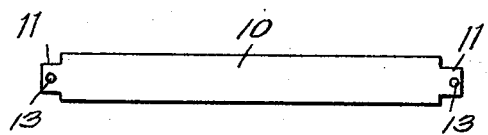
Fig. 10, is a front elevation of the air expelling piston supporting bar.
Figure 11:
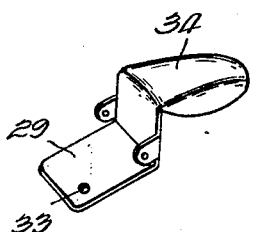
Fig. 11, is a perspective view of the sound controlling valve.

In carrying out the aim of my present invention, I have shown in the drawings, a voice mechanism comprising a cylindrical casing 1 having its body provided with a plurality of front sound outlet openings 2 and provided adjacent said sound outlet openings with the aligned openings 3, 4 and 5.

The open ends of the cylindrical tubular case 1 are provided with the metallic bellows heads 6 and 7 each of which are provided centrally thereof with a slotted opening 8 surrounded by an elongated recess 9 for stationarily supporting a suitable flat slide bar 10 between the bellows heads 6 and 7. The bar 10 is disposed longitudinally of the case 1 and has its ends narrowed as at 11 for passage through the slotted openings 9. A suitable lock pin 12 passes through an opening 13 in each narrowed end 11 of the bar 9 to prevent removal of the ends 11 of the bar 9 from the slotted openings 8 in the bellows heads 6 and 7.

A gravity actuated air expelling member, weight or piston 14 is provided with a central slotted opening 15 and is mounted upon the slide bar 10. The inner ends of two suitable cylindrical collapsible bellows designated 16 and 17 are fixed to the ends of the piston 14 in any suitable manner to prevent air leakage between the bellows and gravity weight, one such way being illustrated as providing the piston 14 adjacent each end thereof with a peripheral groove 18 so that after the inner ends of the bellows 16 and 17 have been slipped over the ends of the piston 14, that the bellows material will be received in the peripheral grooves 18 and held there by means of suitable cords 19 tied around the inner ends of the bellows 16 and 17. The outer ends of the bellows 16 and 17 are pulled over the ends of the case 1 and are held against displacement between the ends of the case and the offset marginal edges of the bellows heads 6 and 7. This arrangement prevents air leakage between the outer ends of the bellows 16 and 17 and bellows heads 6 and 7 as the heads are frictionally held in place at the ends of the casing 1.

The piston 14, which also acts as the inner heads for the bellows 16 and 17, is provided in its side faces with the sound chambers 20 and 21, which are associated with the bellows 16 and 17, respectively. These sound chambers 20 and 21 are provided with the sound outlet openings 22 and 23, respectively, which communicate with the flat valve engaging face 24 of the piston 14. The sound chambers 20 and 21 are each closed at their bellows sides by means of a suitable disc 25 having a channel 26 communicating at one end with its respective sound chamber. A suitable reed 27 is mounted upon each disc 25 over the channel 26 and it is held in position at one end by means of the ears 28 which are clinched over and against the reed 27.

The sound outlet openings 22 and 23 of the sound chambers 20 and 21, respectively, are closed by means of a single flat valve plate 29 hingedly supported at one end by means of the hinge pin 30 carried by the piston 14. A suitable spring element 31 is connected at one end to the piston 14 and then wound around hinge pin 30 with the opposite end 32 thereof exerting pressure against the top face of the flat valve plate 29 for automatically closing the sound outlet openings 22 and 23. The valve plate 29 is provided with a small air escape opening 33 opposite the sound outlet opening 23 leading from the sound chamber 21.

A suitable arm 34 extends outwardly from the hinge end of the valve plate 29 for tripping contact with the shoulders 35, 36 and 37 of a valve plate trip bar 38 carried by the casing 1. The shoulders 35, 36 and 37 of the trip bar 38 pass downwardly through the openings 3, 4 and 5, respectively, of the casing 1 and are disposed in the path of travel of the valve plate arm 34. The shoulders 35, 36 and 37 provide the gaps 39, 40 and 41. The trip bar 38 engages the outer face of the casing 1 and the ends thereof are held in position between the body of the casing 1 and suitable end caps 42 to prevent upward displacement of the bar 38 when the valve plate arm 34 comes into sliding contact with the shoulders 35, 36 and 37 of the trip bar 38 during reciprocating sliding movement of the piston 14 when tilting the voice mechanism sideways to angular positions for alternately producing infant calls simulating the spoken pronunciation "pa-pa" and "ah-ma-ma".

The operation of the voice mechanism is as follows:

When a doll, within which my voice mechanism is positioned transversely of the chest portion thereof, is tilted sideways so that the doll is disposed in an angular position in front of the party holding it, such for instance as tilting the doll so that the head thereof is toward the right of the party holding it, the air expelling member, or piston 14, will by means of gravity be moved downwardly upon the supporting bar 10, as is manifest, assuming of course, that the piston 14 is at the upper end of the bar 10 when the sideways movement of the doll takes place.

At the beginning of the downward movement of the piston 14, the valve plate actuating arm 34 will be depressed, or held down by the shoulder 37 of the trip bar 38, thus holding the valve plate 29 in its open position over the sound outlet openings 22 and 23 of the piston 14. The valve arm 34 continues to be depressed with the downward sliding movement of the piston 14 until it reaches the gap 41 which permits the end 32 of spring 31 to close the valve plate 29 over the sound outlet openings 22 and 23 by raising the valve plate arm 34 into the said gap 41. So far no sound has been produced as the air pressure within the bellows 16 while the arm 34 was depressed by the shoulder 37 had not been increased sufficiently to produce a sound and for the reason that when the arm 34 is raised into the gap 41, the valve plate 29 is closed which prevents the emitting of any sound from the sound outlet opening 22 which has communication with the bellows 16. Now, as the arm 34 is depressed in moving under the shoulder 36, the valve plate 29 raises permitting air to be forced through the reed mechanism associated with the sound chamber 20 and causing the syllable "pa" to be produced which is emitted through the sound outlet opening 22. After this syllable has been produced, the arm 34 is then raised into the gap 40 and the sound outlet opening 22 is closed by the valve plate 29. As the piston 14 continues to move downwardly upon the supporting bar 10, the arm 34 is again depressed while moving under the shoulder 36 of the trip bar 38 and the valve plate 29 again raised permitting air to be forced through the reed mechanism associated with the sound chamber 20 and causing the second syllable "pa" to be produced which is emitted through the sound outlet opening 22 of the piston 14. Further movement of the piston 14 downwardly upon the bar 10 causes the valve plate arm 34 to raise into the gap 39 of the trip bar 38 thereby again closing the valve plate 29 over the sound outlet opening 22. The movement of the piston 14 in the direction just described, it will thus be observed, will have caused the two syllables "pa-pa" to be produced. When the valve plate arm 34 has reached this latter position in gap 39, all of the air within the bellows 16 will have been expelled and the bellows 17 will have been filled with air passing inwardly through the sound outlet opening 23, the sound chamber 21 and the reed mechanism associated with the sound chamber 21.

Now, the tilting of the doll sideways, in the opposite direction, will cause the syllables "ah-ma-ma" to be produced, as follows:

Upon the return movement of the piston 14, the valve plate arm 34 will be initially depressed by engaging the shoulder 35 of the trip bar 38 during movement thereunder and causing the valve plate 29 to be raised permitting air to be forced through the reed mechanism associated with the sound chamber 21 and causing the syllable "ah" to be produced which is emitted through the sound outlet opening 23 of the piston 14. After this sound has been produced, continued downward movement of the piston 14 causes the valve arm 34 to be raised into the gap 40 of the trip bar 38, thereby closing the valve plate 29 over the sound outlet opening 22, as well as opening 23. As the piston 14 moves downward, the arm 34 is then depressed by the shoulder 36 of the trip bar 38 in passing thereunder and the valve plate 29 is again raised permitting air to be forced through the reed mechanism associated with the sound chamber 21 and causing the syllable "ma" to be produced, which is emitted through the sound outlet opening 23 of the piston 14. Further movement of the piston 14 downwardly causes the valve plate arm 34 to be raised into the gap 41 of the trip bar 38, thereby again closing the valve plate 29 over the sound outlet opening 23 of the piston 14, and, as the piston 14 continues in its downward movement, the valve arm 34 is again depressed by passing under the shoulder 37 of the trip bar 38 causing the valve plate 29 to be again raised permitting air to be forced through the reed mechanism associated with the sound chamber 21 and causing the next syllable "ma" to be produced which is emitted through the sound outlet opening 23 of the piston 14. When the valve plate arm 34 has reached this latter position, all of the air in the bellows 17 will have been expelled and the bellows 16 will have been filled with air passed inwardly through the sound outlet opening 22 of the piston 14, the sound chamber 20 and the reed mechanism associated with the sound chamber 20.

From the foregoing description, it is evident that I provide a voice mechanism which will, by causing a single piston or air expelling member associated with two bellows, two reeds and a single valve plate associated with a trip bar, produce the baby call "pa-pa" by the downward movement of the piston in one angular direction, and upon downward movement of the piston in an opposite angular direction produce the baby call "ah-ma-ma". These calls are produced by simply tilting the doll sideways to one angular position and then to the opposite angular position.

It will be apparent from the foregoing description, that as the mechanism is positioned within the doll transversely thereof, that it is the side tilting movement of the doll that causes gravity movement of the piston, or air expelling member 14, thus permitting the doll to be held with its face toward the holder thereof, as wherein with the present types of talking dolls the sound produced emanates either from the rear, or the front of the doll, thus causing the doll to be first placed upon its back and then swung so as to be placed upon its stomach, or vice versa and that the sounds are only produced once with the double movement of the doll, whereas, with my voice mechanism within a doll, sounds are produced with each different side movement of the doll. My mechanism produces two distinct and different calls with the double movement of the doll, whereas, in the present styles of talking dolls only one call is provided with a double movement of the doll.

From the above description, it is apparent that the voice mechanism produces a call of two like syllables when the doll is tilted sideways in one direction, and, that it produces a call of three syllables, two of which are alike when the doll is tilted sideways in the opposite direction, said calls being "pa-pa" and "ah-ma-ma".

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall within the scope of the appended claims when fairly construed.

What I claim is:

1. In a voice mechanism, a tubular casing having its wall perforated to emit sounds, a pair of aligned bellows, a gravity movable piston between the bellows and connected thereto, sound producing means of different articulations carried by opposite ends of the piston and sound controlling means actuated upon alternate movement of the piston.

2. In a voice mechanism for dolls comprising a tubular case having sound outlet openings in its body, a pair of aligned bellows, a gravity moved piston separating said bellows, reed mechanism on opposite sides of the piston associating with said bellows, a sound chamber behind each reed mechanism, a sound outlet passage communicating with each sound chamber, a valve for closing both sound outlet openings at the same time and means for tripping said valve for emitting sound through said sound outlet openings at predetermined intervals.

3. In a voice mechanism, a tubular casing having a portion of its body perforated, a pair of aligned bellows within the casing, a gravity movable air expelling means disposed between the bellows and connected with the inner ends of the bellows, means for slidably supporting said air expelling means, voice producing means carried in opposite ends of the air expelling means through which voice producing means the air is expelled, sound controlling means embodying a valve member cooperatively associated with the voice producing means, said valve member having an air pressure relief opening cooperating with one of the voice producing means and a tripping bar for intermittently actuating the valve member upon alternate movement of the piston to emit different articulated sounds set up by the sound producing means.

4. In a voice mechanism, a tubular casing having its wall provided with sound outlet openings intermediate its ends, a pair of aligned bellows, a gravity movable piston connected to the inner ends of the bellows, caps fixed to the ends of the casing to provide outer end closures for the bellows, a guide bar upon which the piston is slidably mounted, a pair of sound chambers formed in the piston, a reed for each sound chamber, a sound outlet opening for each sound chamber, a single valve plate for closing said sound outlet openings, an arm extending from said valve plate, a trip bar carried by the casing and means on said trip bar for raising the valve plate to permit sound to be emitted from the sound outlet openings at predetermined intervals during the movement of said piston in either direction.

5. In a talking doll, a casing, aligned bellows, a gravity moved piston for collapsing and extending said bellows, reeds carried by the piston and associated with said bellows, a valve associated with said reeds for controlling sounds produced by said reeds, said valve having an air pressure relief opening cooperating with one of said reeds for producing a different sound from the other reed and means for actuating said valve for producing the sounds at predetermined intervals upon the sideways movements of the doll, said sounds being of different articulations during movement of the doll in one direction from the sounds articulated during movement of the doll in an opposite direction.

6. In a voice mechanism, a tubular case, a pair of aligned collapsible tubular bellows, metallic closure caps for the outer ends of the bellows, a gravity moved air expelling piston disposed between said bellows and fixed to the inner ends thereof, a support for said piston to slide upon, a sound chamber formed in each end face of the piston, a reed structure applied to each sound chamber, a sound outlet passage communicating with each sound chamber, a valve plate for opening and closing said sound outlet passages, a spring for normally holding the valve plate in its closed position, an arm extending from said valve plate and means for actuating the valve plate for opening and closing said sound outlet passage at predetermined intervals when the piston is moved by gravity along its support in either direction for producing "pa-pa" sounds when the piston is moved in one direction along its support and for producing "ah-ma-ma" sounds when the piston is moved in the opposite direction along its support.

7. In a voice mechanism for talking dolls, a casing, openings in the body of said casing, a pair of aligned bellows, caps secured to the ends of the casing and acting as heads for the outer ends of the bellows, a supporting bar carried by said caps, an air expelling piston slidably mounted upon said supporting bar, said air expelling piston being secured to the inner ends of the bellows and acting as the inner head for each bellows, a sound chamber formed in each end face of the air expelling piston, a closure plate for each sound chamber, a reed carried by each closure plate, a sound outlet passage directed from each sound chamber and communicating with a flat valve engaging face formed between the ends of the air expelling piston, a hingedly supported valve plate carried by the air expelling piston for opening and closing the sound outlet passages and permitting of the one bellows to be inflated while the other bellows is being deflated, an arm extending from said hinged valve plate, a trip bar carried by the casing, a series of alternately arranged shoulders and gaps directed from along said trip bar for depressing said arm upon sliding movement of the piston to raise the valve plate for opening the sound outlet passages and to allow the arm to be raised after being depressed by the shoulders for lowering the valve plate to close the sound outlet passages.

8. In a voice mechanism for dolls, a casing having sound outlet openings in its body between the ends thereof, a pair of aligned bellows, an air expelling piston between the bellows and connected thereto, a support for bellows, slidably mounting the air expelling piston, means carried by the casing for supporting said support and acting as outer heads for the bellows, a pair of sound producing means carried by the air expelling piston, sound controlling means carried by the air expelling piston and means carried by the casing for tripping the sound controlling means with the sliding movement of the air expelling piston for emitting sound through the air expelling piston upon sliding movement thereof in either direction upon its support.

9. In a voice mechanism for dolls, a casing having sound outlet openings in its body between the ends thereof, a pair of aligned bellows, an air expelling piston between the bellows and connected thereto, a support for slidably mounting the air expelling piston, means carried by the casing for supporting said support and acting as outer heads for the bellows, a pair of sound producing means carried by the air expelling piston, sound controlling means carried by the air expelling piston and means carried by the casing for tripping the sound controlling means with the sliding movement of the air expelling piston for emitting "pa-pa" syllables from the piston which are produced by one of the sound producing means when the air expelling piston is moved along its support by tilting the device sideways in one and emitting "ah-ma-ma" syllables from the piston which are produced by the other sound producing means when the air expelling piston is moved along its support by tilting the device sideways in the opposite direction.

10. In a voice mechanism, a tubular casing having its wall perforated to emit sounds, a pair of aligned bellows, a gravity movable piston between the bellows and connected thereto, sound producing means carried in the ends of the piston and cooperating with said bellows, sound controlling means actuated upon alternating movement of said piston and means for producing a different articulation upon movement of the piston in one direction from the articulation produced upon movement of the piston in the opposite direction.

11. In a voice mechanism for dolls comprising a tubular case having sound outlet openings in its body, a pair of aligned bellows, a gravity moved piston separating said bellows, reed mechanism on opposite sides of the piston associating with said bellows, a sound chamber behind each reed mechanism, a sound outlet passage communicating with each sound chamber, a valve for closing both sound outlet openings at the same time and having an air pressure relief opening in communication with one of the sound chambers and means for tripping said valve for emitting different articulated sounds through said sound outlet openings upon alternate sliding movement of the piston.

12. In a voice mechanism for producing different articulated sounds, a tubular casing having its wall provided with sound outlet openings intermediate its ends, a pair of aligned bellows, a gravity movable piston connected to the inner ends of the bellows, caps fixed to the ends of the casing to provide outer end closures for the bellows, a guide bar upon which the piston is slidably mounted, a pair of sound chambers formed in the piston, a reed for each sound chamber, a sound outlet opening for each sound chamber, a single valve plate for closing said sound outlet openings, said valve plate having an air pressure relief opening communicating with one of the sound chambers, an arm extending from said valve plate, a trip bar carried by the casing and means on said trip bar for raising the valve plate to permit sound to be emitted from the sound outlet openings at predetermined intervals during the movement of said piston in either direction.

13. In a voice mechanism, a tubular case, a pair of aligned collapsible tubular bellows, metallic closure caps for the outer ends of the bellows, a gravity moved air expelling piston disposed between said bellows and fixed to the inner ends thereof, a support for said piston to slide upon, a sound chamber formed in each end face of the piston, a reed structure applied to each sound chamber, a sound outlet passage communicating with each sound chamber, a valve plate for opening and closing said sound outlet passages, said valve plate having an air pressure relief opening therein and communicating with one of said sound chambers, a spring for normally holding the valve plate in its closed position, an arm extending from said valve plate and means for actuating the valve plate for opening and closing said sound outlet passage at predetermined intervals when the piston is moved by gravity along its support in either direction for producing "pa-pa" sounds from the sound chamber provided with the air pressure relief opening when the piston is moved in one direction along its support and for producing "ah-ma-ma" sounds when the piston is moved in the opposite direction along its support.

14. In a voice mechanism for talking dolls for producing sounds of different articulations upon tilting movement of the doll in opposite directions, a casing, said casing having openings in the body thereof, a pair of aligned bellows, caps secured to the ends of the casing and acting as heads for the outer ends of the bellows, a supporting bar carried by said caps, an air expelling piston slidably mounted upon said supporting bar, said air expelling piston being secured to the inner ends of the bellows and acting as the inner head for each bellows, a sound chamber formed in each end face of the air expelling piston, a closure plate for each sound chamber, an air pressure relief opening for one of said sound chambers, a reed carried by each closure plate, a sound outlet passage directed from each sound chamber and communicating with a flat valve engaging face formed between the ends of the air expelling piston, a hingedly supported valve plate carried by the air expelling piston for opening and closing the sound outlet passages, an arm extending from said hinged valve plate, a trip bar carried by the casing, a series of alternately arranged shoulders and gaps directed from along said trip bar for depressing said arm upon sliding movement of the piston to raise the valve plate for opening the sound outlet passages and to allow the arm to be raised after being depressed by the shoulders for lowering the valve plate to close the sound outlet passages.

15. In a voice mechanism for dolls for producing sounds of different articulations upon tilting movement of a doll in opposite directions, a casing having sound outlet openings in its body between the ends thereof, a pair of aligned bellows, an air expelling piston between the bellows and connected thereto, a support for slidably mounting the air expelling piston, means carried by the casing for supporting said support and acting as outer heads for the bellows, a pair of sound producing means carried by the air expelling piston, sound chambers within the piston, sound controlling means carried by the air expelling piston having an air pressure relief opening communicating with one of the sound chambers and means carried by the casing for tripping the sound controlling means upon sliding movement of the air expelling piston for emitting sounds through the sound chambers of the air expelling piston upon sliding movement thereof in either direction upon its support.

16. In a voice producing device for dolls, a casing having sound outlet openings in its body between the ends thereof, a pair of aligned bellows, an air expelling piston between the bellows and connected thereto, a support for slidably mounting the air expelling piston, means carried by the casing for supporting said support and acting as outer heads for the bellows, a pair of sound producing means carried by the air expelling piston, sound chambers within the piston, sound controlling means having an air pressure relief opening cooperating with one of the sound chambers carried by the air expelling piston and means carried by the casing for tripping the sound controlling means upon sliding movement of the air expelling piston for emitting "pa-pa" syllables from the sound chamber having the air pressure relief opening cooperating therewith, which syllables are produced by one of the sound producing means when the air expelling piston is moved along its support by tilting the device sideways in one direction, and emitting "ah-ma-ma" syllables from the other sound chamber of the piston which syllables are produced by the other sound producing means when the air expelling piston is moved along its support by tilting the device sideways in the opposite direction.

In testimony whereof I have hereunto affixed my signature.

ARTHUR PETROV.